United States Patent [19]
Katzer

[11] 3,897,117
[45] July 29, 1975

[54] CENTERING DEVICE FOR A RAIL BRAKE MAGNET

[75] Inventor: Ernst Katzer, Munich, Germany

[73] Assignee: Knorr-Bremse GmbH, Munich, Germany

[22] Filed: July 12, 1974

[21] Appl. No.: 488,258

[30] Foreign Application Priority Data
July 20, 1973 Germany.............................. 2336999

[52] U.S. Cl.................................. 308/3 R; 188/165
[51] Int. Cl.²..................... F16C 29/02; F16d 65/34
[58] Field of Search ........ 308/3 R; 188/165; 105/78

[56] References Cited
UNITED STATES PATENTS
3,840,096  10/1974  Tolksdort............................ 188/165

*Primary Examiner*—M. Henson Wood, Jr.
*Assistant Examiner*—Gene A. Church
*Attorney, Agent, or Firm*—Edmund M. Jaskiewicz

[57] ABSTRACT

A rail brake magnet is centered in its raised inoperative position with respect to the vehicle structure from which it is suspended by means of a guide element having a centering bore therethrough mounted on the vehicle structure and a centering pin having one end mounted on the magnet. The other end of the centering pin is conical and there is a cylindrical surface on the centering pin adjacent the conical end surface with the diameter of this cylindrical surface being approximately equal to that of the centering bore so that this portion of the centering pin can be received in the bore. There is a second conical surface diverging from the pin cylindrical surface to abut a conical surface surrounding the guide element bore when the magnet is in its raised position. The guide element is resiliently mounted on the vehicle structure by means of a tubular boss which boss is adjustable in a horizontal plane with respect to the structure.

8 Claims, 3 Drawing Figures

CENTERING DEVICE FOR A RAIL BRAKE MAGNET

The present invention relates to the suspension of a rail brake magnet from the vehicle structure, more particularly, to a device for centering the rail brake magnet when in the raised position with respect to the vehicle structure.

Various vehicles, and particularly railway vehicles, have been provided with magnetic brakes wherein braking is achieved by lowering a magnetic rail brake unit into contact with the surface upon which the vehicle is traveling. In railway vehicles such brakes are generally electromagnetic in nature and comprise a magnet which is normally suspended in a raised inoperative position from which it is lowered into a braking position. In order to position the magnet when in the raised position cooperating conical surfaces have been provided both on the magnet and on the vehicle structure from which the magnet is suspended.

When the magnet is in its raised inoperative position various forces act upon the magnet because of the movement of the traveling vehicle. Such forces produce undesirable oscillations which must be absorbed by elements mounted on the vehicle. Since all of these various elements must be protected as much as possible against any horizontally directed forces it has been desirable to provide various devices to prevent such undesirable transverse forces and oscillations from contacting the various components of the magnetic rail brake unit.

In addition, the rail brake magnet is usually laterally displaced a distance of several millimeters from its normal track-related position because of its clearance in a lateral direction and because of the oscillating movements to which it is subjected. It is desired that the brake magnet is moved precisely into its retaining stops when it is lifted from its operative to its inoperative position and the magnet should be securely retained in its inoperative position so that any centering or aligning devices employed for positioning the magnet when in its raised position are free from wear.

The German Offenlegungsschrift No. 1,903,315 discloses a suspension device for the purpose of preventing oscillation of the rail brake magnet when in the raised position. This device comprises a stop element on the brake magnet which engages correspondingly shaped conical surfaces secured on the frame of the vehicle. Because of the conical shape of these surfaces the magnet is held substantially rigidly on the frame against lateral displacement and oscillations of the magnet in any direction are diminished. However, this known device has not been satisfactory in operation because acceleration forces generated in the horizontal direction produce horizontal resultant forces against the conical stop surfaces which bring about a frictional stressing on opposing areas of the conical surfaces. These stresses produce a relatively rapid wear of these stop surfaces and thus necessitate eventual readjustment or replacement.

Because of these acceleration forces which the conical stop surfaces must absorb the stop surfaces operate as wedge surfaces and produce downwardly directed intermittent tensile stresses with respect to the retaining element of the suspension device.

Because of deviations resulting from assembly of the brake magnet or oscillations of the magnet produced during operation of the vehicle a relatively high degree of eccentricity may result in the cooperating retaining elements. Thus, when the magnet is raised from its operative or its inoperative position the initial sliding contact of the conical stop surfaces always occurs at the same stop or abutment position since the abutment surfaces are in a predetermined relative position. Since the magnet is urged into its desired centered position only by the contacting relationship between the stop elements it is readily apparent that this portion of the surfaces which is initially subjected to contact will wear at a relatively high rate.

It is therefore the principal object of the present invention to provide a novel and improved device for suspending a brake magnet when the magnet is in its raised inoperative position.

It is another object of the present invention to provide a novel and improved device for centering a brake magnet in its raised inoperative position with respect to the vehicle structure from which it is suspended.

It is a further object of the present invention to provide a centering device for a brake magnet which is simple in construction, inexpensive to manufacture and is capable of long, reliable and accurate operation.

It is additional object of the present invention to provide such a centering device which is horizontally and vertically adjustable, laterally non-displaceable and which will readily absorb both horizontal and vertical forces without adversely affecting its operation.

Accordingly to one aspect of the present invention a device for aligning a brake magnet in the raised inoperative position with respect to the vehicle structure from which it is suspended may comprise a guide element mounted on the vehicle structure and having a centering bore with a conical surface around the bore. A centering pin having a conical surface on one end has its other end mounted on the magnet. A centering pin is provided with a cylindrical surface adjacent its conical end and the cylindrical surface has a diameter approximately equal to that of the centering bore so that this portion of the centering pin can be received within the bore. A second conical surface diverges from the first cylindrical surface on the centering pin and abuts the guide element conical surface when the magnet is in its raised position. The guide element is resiliently retained within a tubular boss which it is rigidly mounted on the frame of the vehicle.

Other objects and advantages of the invention will be apparent upon reference to the accompanying description when taken in conjunction with the following drawings, which are exemplary, wherein.

Proceeding next to the drawings wherein like reference symbols indicate the same parts throughout the various views, a specific embodiment of the present invention will be described in detail.

Figure 1:
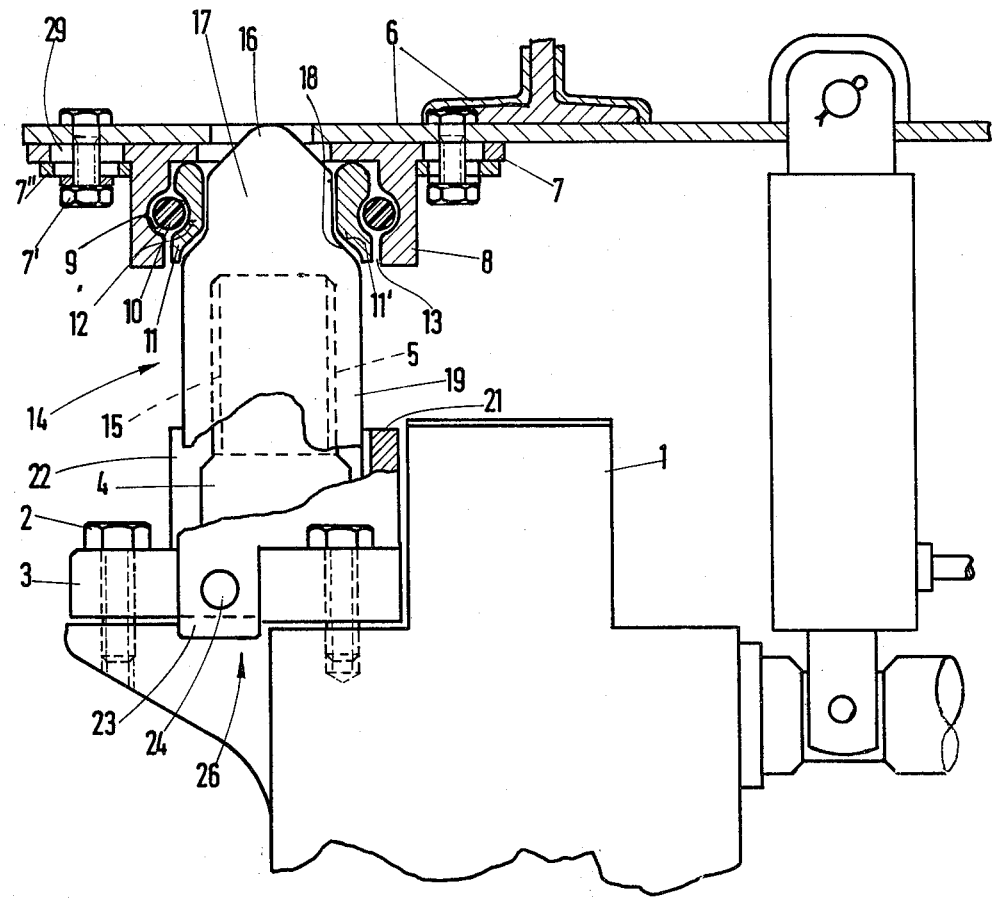
FIG. 1 is an elevational view of a magnet suspension device incorporating the centering device of the present invention with the upper portion of the suspension device being shown in section.
Figure 2:
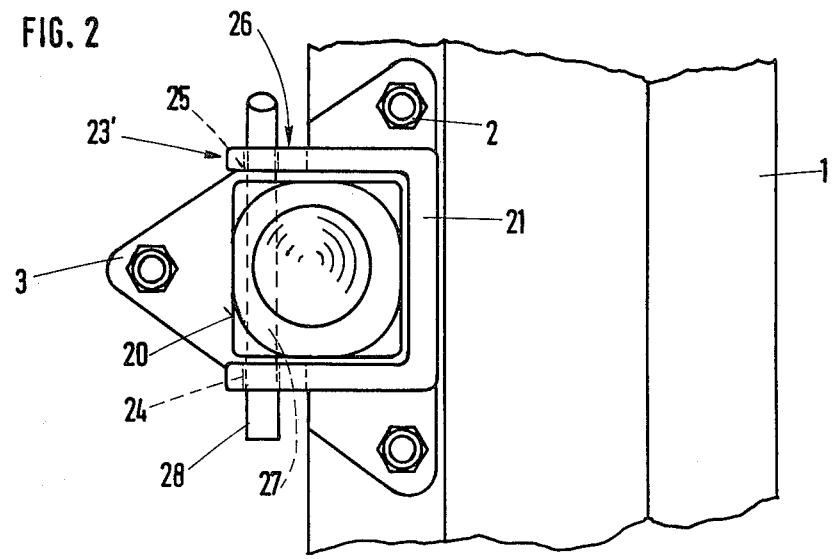
FIG. 2 is a top plan view of the centering device of FIG. 1 but with the vehicle structure centering device being omitted.
Figure 3:
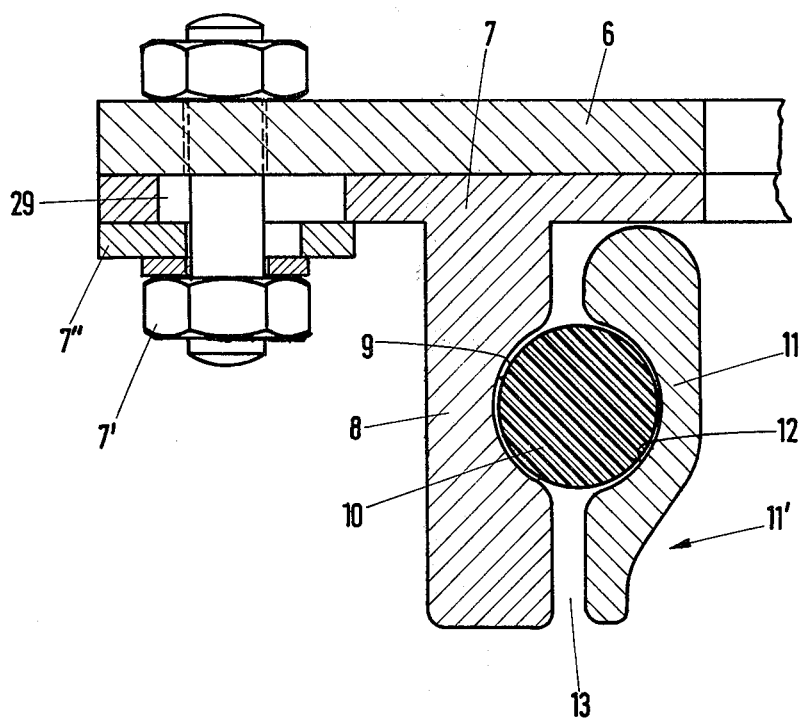
FIG. 3 is a sectional view through the guide element in enlarged scale showing its mounting upon the vehicle structure.

As may be seen in FIG. 1, there is a brake magnet 1 on the upper surface of which is mounted a substantially triangular bracket 3 by means of bolts 2. Rigidly upstanding from the center of the bracket 3 is a mounting pin 4 having external threads 5.

A tubular boss 8 having a base plate 7 is mounted upon a fixed element of the vehicle bogie such as a carrier 6 by means of threaded bolts 7' having washers 7''. The inner wall of the tubular boss 8 is provided with a groove 9 having approximately a semi-circular cross section into which is fitted a rubber ring 10. Closely fitted and squeezed within the rubber ring 10 is an annular guide element 11 provided with a central centering bore and having a conical surface 11' at one end thereof. On the peripheral surface of the guide element 11 is formed a corresponding semi-circular groove 12 which is opposed from the groove 9 so as to receive the ring 10 therein.

The peripheral surface of the guide element 11 is spaced from the inner wall of the tubular boss 8 so as to define a gap 13 therebetween. The gap 13 is of such a magnitude that the guide element 11 can be assembled between the tubular boss 8 by squeezing the guide element through the rubber ring 10 and at the same time there is a predetermined degree of horizontally extending resilient clearance for the guide element 11 with respect to the mounting boss 8.

A centering pin 14 having a threaded bore 15 from one end thereof is screwed onto the mounting pin 4. The centering pin 14 has an upper free end 16 which is conical in shape and adjacent thereto a cylindrical section 17 whose diameter is approximately equal to the diameter of the bore of guide element 11 so as to be received therein. A cylindrical portion 17 is immediately followed by a diverging conical surface 18 which merges into a longer sleeve portion 19 which is at its lower portion substantially square in cross section. The sleeve portion 19 which is below the conical surface 18 carries the threaded bore 15.

The lower square portion of the sleeve 19 has one face 20 which is free and its other three faces are engaged by a correspondingly u-shaped bracket 21. On the lower portions of the ends 22 of the bracket 21 are lugs 23,23' having aligned horizontally extending bores 24,25 therethrough. The bracket 3 has on two sides thereof recesses 26 having vertical or perpendicular faces to receive the lugs 23,23' on their inner surfaces when the bracket 21 is mounted upon the bracket 3.

When the brake magnet 1 is raised from its operative position to its inoperative position, the centering pin 14 is received within the bore of guide element 11 of the tubular boss 8 and the conical surface 18 of the centering pin is engaged firmly against the corresponding conical surface 11' of the guide element. The space between the raised magnet 1 and the rail may be readily adjusted or corrected because of the vertical adjustability of the centering pin 14 with respect to the mounting pin 3. To make this adjustment the bracket 21 is removed and the sleeve 19 is threaded in the proper direction to raise or lower the centering pin 14 with respect to the bracket 3. In this manner the distance between the upper edge of the brake magnet 1 and the guide element 11 can be quickly and precisely adjusted in either direction.

The resilient mounting of guide element 11 by means of the rubber ring 10 squeezed into the grooves 9 and 12 provides resilient lateral support to the brake magnet 1 upon the occurence of any horizontally directed acceleration forces. This is due to the centering of the pin 14 in abutting relationship with the centering bore of the guide element 11.

In addition, the conical surface 11' of the guide element 11 resiliently absorbs in the upward direction any load occurring during the raising of the magnet 1 because of the differential between the force exerted to raise the magnet with respect to the mass of the magnet.

The centering bore in the guide element 11 does not provide free play to the centering pin 14 received therein in the event that any transversely acting forces should occur. As a result, frictional forces which would produce wear do not occur between the conical surface 18 of the centering pin 14 and the conical surface 11' of guide element 11.

The base plate 7 of tubular boss 8 is provided with apertures 29 whose diameter is substantially larger than the diameter of the securing bolts 7'. As a result, the base plate 7 can be readily displaced in the horizontal plane so as to adjust the guide element 11 with respect to the centering pin 14. The base plate 7 is firmly attached to the carrier structure 6 by means of the washers 7'' which are of a sufficient size to cover the apertures 29 and are attached to the bolts 7'. This lateral displacement of the base plate 7 thus eliminates any laterally directed tensioning effects on the suspension device when the brake magnet 1 is raised to its inoperative position.

Thus it can be seen that a suspension device for a brake magnet is provided with a centering device for centering the raised brake magnet which centering device is constructed so as to minimize wear on the contacting surfaces and which provides an optimum stabilizing effect on the magnet when it is raised to its inoperative position. In addition, the components of the centering device which are in abutting relationship are adjustable both vertically and horizontally so as to virtually guarantee unimpeded movement of the magnet between its raised and lowered positions. The raised magnet is freely retained in its inoperative position free from any forces and free of any jamming which might possibly hinder normal operation of the magnet.

It will be understood that this invention is susceptible to modification in order to adapt it to different usages and conditions, and accordingly, it is desired to comprehend such modifications within this invention as may fall within the scope of the appended claims.

What is claimed is:

1. A device for aligning a rail brake magnet in the raised inoperative position with respect to the vehicle structure from which it is suspended, comprising a guide element on said vehicle structure and having a centering bore with a first conical surface around said bore, a centering pin having a conical surface on one end thereof and its other end mounted on said magnet, a first cylindrical surface on said centering pin adjacent said conical end surface and having a diameter approximately equal to that of said centering bore so as to be received therein, and a second conical surface diverging from said first cylindrical surface and engageable with said guide element conical surface when the magnet is in its raised position.

2. A device as claimed in claim 1 and means on said vehicle structure for resiliently mounting said guide element thereon.

3. A device as claimed in claim 1 and comprising a tubular boss rigidly mounted on said vehicle structure, said guide element being received within said tubular boss with a gap between the peripheral edge of the guide element and the inner wall of said tubular boss, there being opposed grooves in said peripheral edge and said inner wall, and a resilient ring positioned within said opposed grooves to retain said guide element within said tubular boss.

4. A device as claimed in claim 1 and comprising a threaded mounting pin rigidly mounted at one end thereof on the magnet, said centering pin having a threaded bore therein from its other end into which said mounting pin is threaded.

5. A device as claimed in claim 1 wherein the lower portion of said centering pin below said first cylindrical surface has a substantially square cross section, and a substantially square U-shaped bracket enclosing said square section of said centering pin and mounted on said magnet to secure said centering pin against rotation.

6. A device as claimed in claim 5 and comprising a bracket on said magnet and having recesses on opposed edges thereof, said U-shaped bracket having lugs thereon fitting into said recesses, there being aligned bores in said lugs and a bore in said bracket aligned with said lug bores when said lugs are in said recesses, and a retaining pin through said lug and bracket bores to prevent removal of said centering pin from said magnet.

7. A device as claimed in claim 2 and comprising means on said guide element mounting means for adjustably positioning said mounting means in a horizontal plane.

8. A device as claimed in claim 7 wherein said guide element mounting means has a plurality of apertures therein and bolts through said apertures to secure said mounting means to the vehicle structure, said apertures having diameters substantially greater than the diameters of the bolts passing therethrough.

* * * * *